(12) United States Patent
Harmless et al.

(10) Patent No.: US 7,384,563 B2
(45) Date of Patent: Jun. 10, 2008

(54) METHOD FOR PURIFYING WATER WITH OZONE AND ULTRASONIC ENERGY

(75) Inventors: H. Martin Harmless, Indianapolis, IN (US); Robert L. Plummer, Indianapolis, IN (US)

(73) Assignee: ECSI International, Inc., Clifton, NJ (US)

( * ) Notice: Subject to any disclaimer, the term of this patent is extended or adjusted under 35 U.S.C. 154(b) by 0 days.

(21) Appl. No.: 11/420,994

(22) Filed: May 30, 2006

(65) Prior Publication Data

US 2006/0289361 A1 Dec. 28, 2006

Related U.S. Application Data

(63) Continuation of application No. 10/602,902, filed on Jun. 24, 2003, now Pat. No. 7,052,613.

(51) Int. Cl.
  *C02F 1/20* (2006.01)
  *C02F 1/36* (2006.01)
  *C02F 1/78* (2006.01)

(52) U.S. Cl. ............... 210/748; 210/750; 210/760; 210/767

(58) Field of Classification Search .......... 210/748, 210/750, 758, 760, 764, 767; 422/20, 283, 422/33; 95/30, 266
See application file for complete search history.

(56) References Cited

U.S. PATENT DOCUMENTS

| | | | | | |
|---|---|---|---|---|---|
| 4,042,509 | A | * | 8/1977 | Bowen | 210/192 |
| 4,076,617 | A | * | 2/1978 | Bybel et al. | 210/748 |
| 5,087,374 | A | * | 2/1992 | Ding | 210/673 |
| 5,130,032 | A | * | 7/1992 | Sartori | 210/748 |
| 5,683,576 | A | * | 11/1997 | Olsen | 210/138 |
| 5,997,752 | A | * | 12/1999 | Leu et al. | 210/760 |
| 6,736,979 | B2 | * | 5/2004 | de Meulenaer et al. | 210/695 |
| 7,052,613 | B1 | * | 5/2006 | Harmless et al. | 210/748 |

\* cited by examiner

*Primary Examiner*—Matthew O Savage
(74) *Attorney, Agent, or Firm*—Mathew R. Schantz; Bingham McHale LLP

(57) ABSTRACT

A method and apparatus for using a combination of sonication and ozone to decontaminate pressurized water. The process includes pumping polluted water from a source, such as a creek, river, pond or the like. The water is transferred to a treatment container where it is dissolved air is removed via vacuum, sonication, or both. Ozone is then dissolved into the water to destroy or otherwise remove pollutants. Dissolved gasses are once again then removed from the water. The treated water may then be piped to a storage tank for subsequent use. The uninterrupted sequential transfer of water from the source, through a treatment container and to the storage tank may be accomplished automatically by way of electronic sensors, valves and pumps that are made to communicate with a central processor control unit.

7 Claims, 4 Drawing Sheets

METHOD FOR PURIFYING WATER WITH OZONE AND ULTRASONIC ENERGY

REFERENCE TO RELATED APPLICATION

The present application is a continuation application claiming priority to, and based upon, U.S. patent application Ser. No. 10/602,902, filed Jun. 24, 2003, now U.S. Pat. No. 7,052,613.

BACKGROUND OF THE INVENTION

Clean water has become increasingly important as both industrialization and population have increased. One contributor to water pollution is the presence of pathogens, such as bacteria, protozoans and viruses in the water. Another contributor to water pollutant is the presence of chemicals and heavy metals in the water. A third contributor to water pollution is solid material suspended or dissolved in the water. Ideally, water pollution is addressed by removing or neutralizing all of the pollutants from the water.

Prior art attempts to purify polluted water have included neutralizing pathogens and/or removing via the addition of chemicals, such as chlorine, polyelectrolytes, and/or flocculants to kill bacteria and/or remove metals therefrom. These techniques necessarily add chemicals to the water, effectively adding "lesser" pollutants to remove "greater" pollutants. In addition to adding new chemicals to the water supply, these techniques first necessitate the production of those chemicals through processes that inherently produce chemical by-products that also must be disposed of and can pose pollution hazards as great or greater than those being addressed in the first place.

Probably the most popular chemical disinfectant is chlorine. However, recent studies have indicated that the addition of concentrations of chlorine to water may lead to the unintentional chlorination of otherwise less harmful chemical compounds to produce carcinogenic chlorinated chemicals. Obviously, a trade-off of bacteria for carcinogens is unacceptable.

Other chemical disinfectants, such as sulfur dioxide, do not exhibit the carcinogen risk of chlorine, but are generally less effective as disinfectants. Therefore, greater quantities of the alternative disinfectants are required to equal the disinfecting power of chlorine, increasing the amount of chemicals added to the water. These alternatives are not only expensive, but constitute significant chemical pollution in their own right.

There is therefore a need for a device or system that purifies water without otherwise adding harmful chemicals thereto. The present invention addresses this need.

SUMMARY OF THE INVENTION

The present invention relates to a method and apparatus for using a combination of sonication and ozone to decontaminate pressurized water. The process includes pumping water from a source, such as a creek, river, pond or the like. The water is initially treated with ozone, strained and filtered, and then transferred to a treatment container where it is pressurized for treatment with ozone and ultrasound. The treated water is then piped to a storage tank for subsequent use. The uninterrupted sequential transfer of water from the source, through a treatment container and to the storage tank is accomplished automatically by way of electronic sensors, valves and pumps that are made to communicate with a central processor control unit.

One object of the present invention is to provide an improved system for water purification. Related objects and advantages of the present invention will be apparent from the following description.

DETAILED DESCRIPTION OF THE PREFERRED EMBODIMENTS

Figure 1:
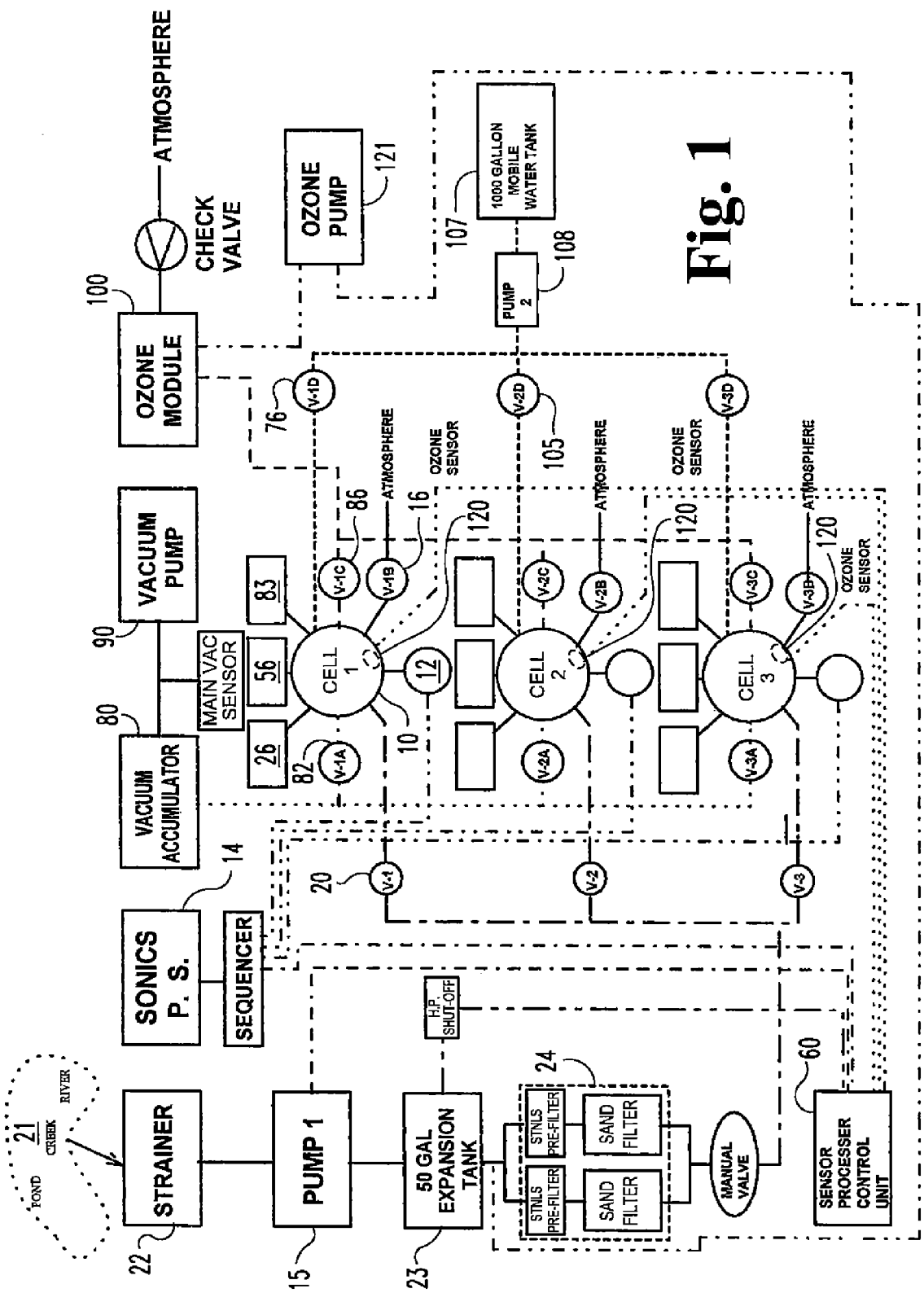
FIG. 1 is a schematic representation of a water purification system provided by a currently preferred embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a system 5 for purifying water, as illustrated generally in FIG. 1. The system 5 includes a water purification vessel or cell 10 for holding a quantity of water during the purification process. The cell 10 is preferably of a right circular cylindrical shape, and is preferably formed of a structural material such as stainless steel. The cell 10 may be formed to have a capacity of any convenient volume. Further, the cell 10 may be stationarily mounted or may be mobile (i.e., mounted on a platform 11 carried by vehicle or otherwise configured to be used in various remote locations).

An ultrasonic generator or converter 12 is connected in ultrasonic communication with the interior of the cell 10. Preferably, the converter 12 is secured to the bottom interior of the cell. The converter 12 is electrically connected to a sonic pulse sequencer 14. The sonic pulse sequencer 14 actuates the converter 12 to produce ultrasonic outputs of specific frequencies or frequency patterns. In other words, the sonic pulse sequencer 14 functions like an ultrasonic tone generator, driving the converter 12 as its ultrasonic 'speaker'. The converter 12 is preferably capable of generating tones of between about 25 and 45 kilocycles or kilo Hertz (kHz) at up to about 5000 Watts, and more preferably is adapted to generate a tone of 25 kilocycles at about 3000 Watts.

The cell 10 is also connected in hydraulic communication with a pump 15 and in pneumatic communication with the atmosphere through air valve 16. A fill valve 20 is hydraulically connected between the pump 15 and the cell 10. The pump is also hydraulically connected to the polluted water source desired to be cleaned, such as through an intake conduit system 21. The pump 15 is preferably self-priming and is also preferably positioned close to the polluted water source, more preferably within about 20 feet. The pump 15 preferably includes an impeller formed from a tough structural material, such as brass or steel.

The water intake system 21 preferably includes a conduit for introducing water into the cell through the valve 20. The water intake system more preferably includes a strainer 22 for interfacing with the polluted water and preventing any relatively large solid particles from entering the cell 10 or the pump 15. The strainer 22 is preferably positioned in hydraulic communication between the pump 15 and a polluted water supply. The strainer 22 is preferably removably attachable to the intake system 21, such that it may be readily replaced or cleaned. The intake system also includes an expansion tank 23 hydraulically connected between the pump 15 and the valve 20, with a tandem filter system 24 preferably connected thereto. The expansion tank preferably has a capacity of at least about 50 gallons, and is preferably non-opaque. The tandem filter system 24 preferably includes a pair of prefilter/sand filter units 25 hydraulically connected in parallel between the expansion tank 23 and the valve 20. The filter units 25 are preferably operated one at a time, and are preferably adapted to be automatically backflushed.

A water sensor 26 is positioned within the cell 10 at a predetermined level coincident with the water level when the cell 10 is filled to a point defined as "full". A vacuum sensor 56 is also positioned within the cell 10 and adapted to detect the presence of vacuum therein. Water sensor 26 and vacuum sensor 56 are electrically connected to an electronic controller 60. Water sensor 26 is adapted to send a first signal to the controller 60 when the sensor 26 is not in the presence of water and a second, different signal to the controller 60 when the sensor 26 is in the presence of water. Likewise, vacuum sensor 56 is adapted to send signals to the electronic controller 60 indicating the presence or absence of vacuum at some predetermined threshold level.

Electronic controller 60 is also electrically connected to valves 20, 16. Electronic controller 60 is preferably adapted to send control signal to the valves 16, 20, and the valves 16, 20 are more preferably adapted to open and shut in response to control signals from the controller 60. More preferably, valves 16, 20 are solenoid-type valves or the like.

The system 5 also includes a vacuum accumulator 80 connected in pneumatic communication with the cell 10 and preferably includes a vacuum valve 82 connected pneumatically therebetween and also connected in electric communication with the electronic controller 60. Preferably, a pressure sensor 83 (such as for determining when the evacuation of the cell 10 is complete) is positioned within the cell 10 and electrically connected to the electronic controller 60. The vacuum accumulator 80 is also pneumatically connected to a vacuum pump 90. An ozone pump 121 is pneumatically connected to the system to pump ozone to a point in the piping downstream of expansion tank 23 and upstream of filter 24. An ozone valve 86 is pneumatically connected between the cell 10 and an ozone generator 100, with the connection to the cell 10 preferably being positioned at or near the bottom of the cell 10. An ozone sensor 120 is situated in the cell to monitor ozone usage. The ozone sensor 120 is electrically connected to the sensor processor control unit 60. A discharge valve 105 is hydraulically connected between the cell 10 and a storage tank 107, preferably with a drainage pump 108 therewith, such as connected in hydraulic communication between the valve 105 and the storage tank 107.

While discussed in the singular above, the preferred system 5 includes a plurality of cells 10 hydraulically connected in parallel between the intake system 21 and the storage tank 107 (three cells are disclosed in FIG. 1; however, any convenient number of cells 10 may be chosen, preferably at least enough to efficiently purify the desired polluted water source).

In operation, polluted or otherwise contaminated water is pumped through the intake system 21 from a water source, such as a creek, river, pond or the like. The water is strained (via strainer 22), passed through an expansion tank 23, ozonated to begin disinfection and prolong the life of the filter system 24 as the water leaves the expansion tank 23, filtered (via filter system 24) and then piped into cell 10. Once filled, cell 10 is pressurized and treated with ozone and ultrasound. Preferably, the system 5 includes a plurality of cells 10, and the operation of the cells 10 is "staggered" such that each cell 10 is emptied into water storage tank 107 in succession to minimize the amount of time taken to fill the storage tank 107. The time the water is retained in cell 10 depends on the amount of pollutants in the influent. In other words, while the first cell is purifying a full load of water, the next cell 10 is filling, as shown in the 3-celled example of FIG. 3.

The uninterrupted sequential transfer of water from the source, through a cell 10 and to the storage tank is preferably accomplished automatically by way of the electronic sensors 26, 56, 83, valves 16, 20, 82, 86, and pumps 15, 108 that are made to communicate with a central processor control unit 60. The operation of only one cell 10 is described in detail below, but the preferred embodiment uses more than one, and the drawing shows three.

After the water has been strained and filtered, fill valve 20 opens, and pump 15 transfers the strained and filtered water into the cell 10. During this fill process, valve 16 is also open to the atmosphere to prevent gas backpressure buildup within the cell 10 so that the cell 10 may more easily fill. Water sensor 26 detects that the cell 10 is full of water and communicates the same to the processor control unit 60. The electronic controller 60 then sends a signal to the valves 20, 16 instructing them to close. Vacuum valve 82 is opened, and the cell 10 becomes pressurized due to a vacuum introduced by vacuum accumulator 80, which is maintained under pressure by vacuum pump 90. The vacuum pressure urges unwanted gasses from the water, such as dissolved air components. Once vacuum sensor 56 detects a pressure of about 18-21 inches of mercury, ozone valve 86 opens. The vacuum, or reverse pressure, urges ozone gas from ozone generator 100 into the cell 10. Optionally, an atomizer 119 can be used for increasing the surface area of contact between the water and the ozone as the ozone is introduced into the cell 10 (See FIG. 2). The ozone sensor 120 begins monitoring the ozone usage rate and reports the data to the sensor processor control unit 60.

Concurrent with this operation, the sonic pulse sequencer 14 activates the converter 12. The converter 12 operates to transduce electrical energy into sound energy, which is then introduced into the cell 10. The benefit of sonication of the polluted water is at least threefold. First, sonication efficiently mixes the ozone in the water, allowing the ozone to more quickly and completely kill bacteria and other microorganisms present in the water. Second, sonication disrupts living cells and cell membranes, contributing to the disinfecting process. Third, high-energy sonication accretes heavy metals, allowing them to be removed through precipitation or subsequent filtration. After the ozone sensor 120 monitoring ozone usage rates in the cell 10 indicates to the sensor processor control unit 60 that the ozone is no longer being utilized for oxidation of biological or chemical contamination, discharge valve 76 opens, allowing water from the cell 10 to flow into the storage tank 107, and ozone distribution to the cell 10 is stopped through the closing of the ozone valve 86, completing the disaffection treatment.

Figure 3:
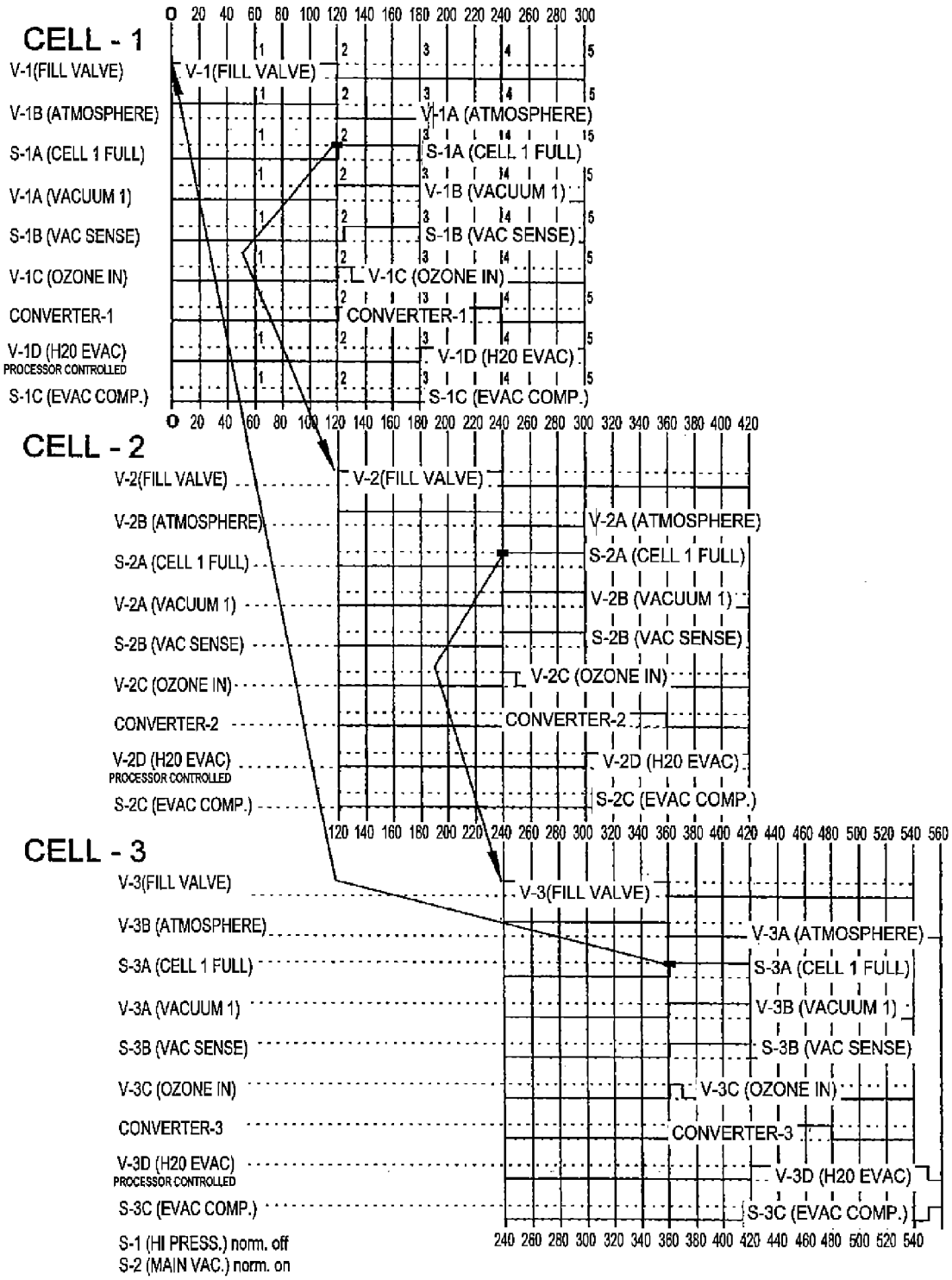
FIG. 3 is a chart showing the timing of the operation of a 3-celled embodiment of the water purification system.
Figure 4:
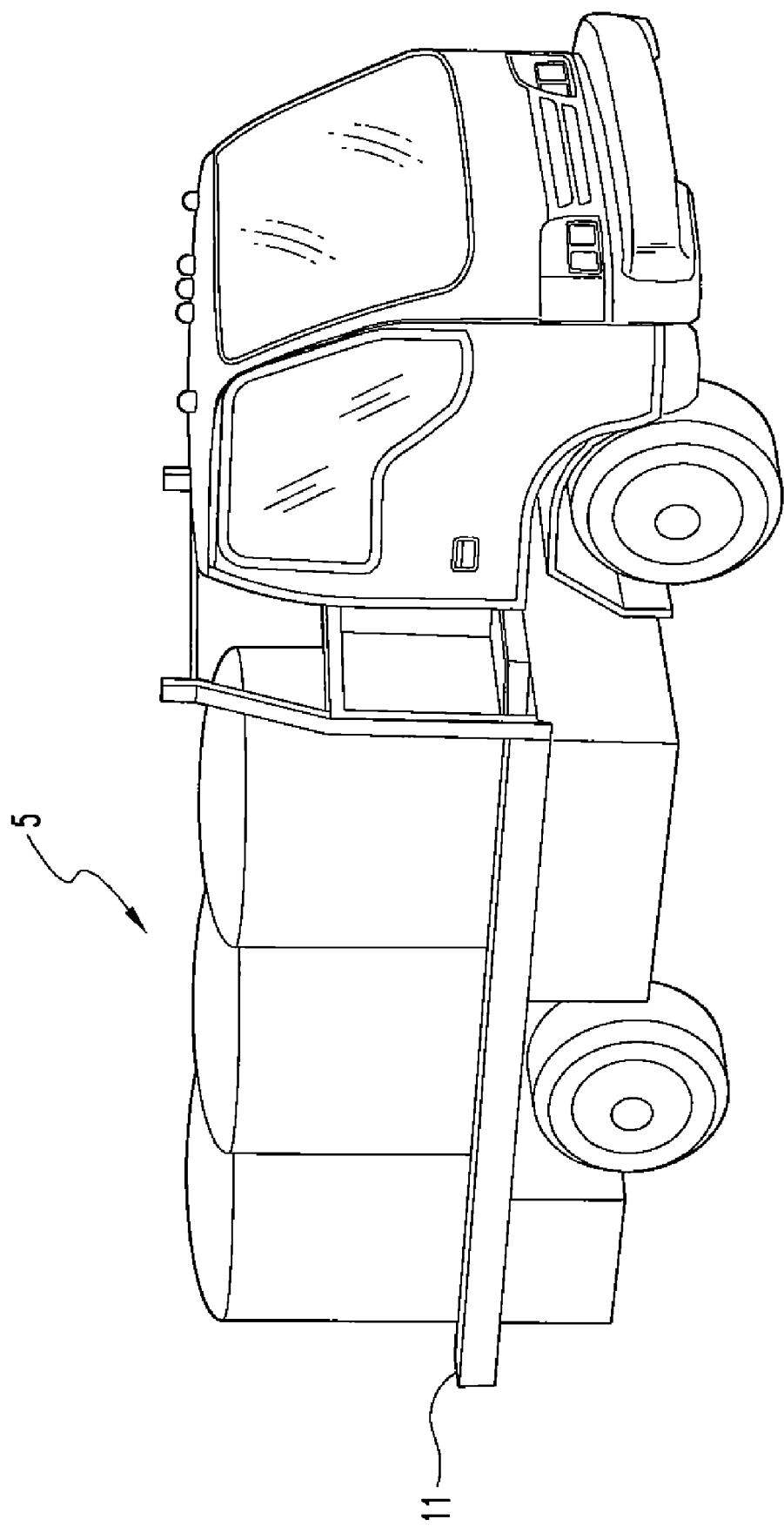
FIG. 4 is a diagrammatic representation of an embodiment of a water purification system operably mounted onto a motor vehicle.

While the above embodiment of the present invention is described primarily as a stationary installation, it is also contemplated that the system 5 present invention may be made mobile, such as by being mounted, in whole or in part, to a platform on a vehicle, as shown in FIG. 3. For example, the system 5 may include at least one cell 10 mounted for operation on a vehicle or trailer for emergency transport so as to readily travel to locations having no potable water supplies. Such an embodiment might not include an integral power source, pump, strainer, and/or expansion tank or the like, as these items may be provided on-site. Another aspect of the invention is a system 5 as described above that is transportable by aircraft to be "dropped" or "airlifted" to the location where temporary personnel can train local inhabitants in its use.

Figure 2:
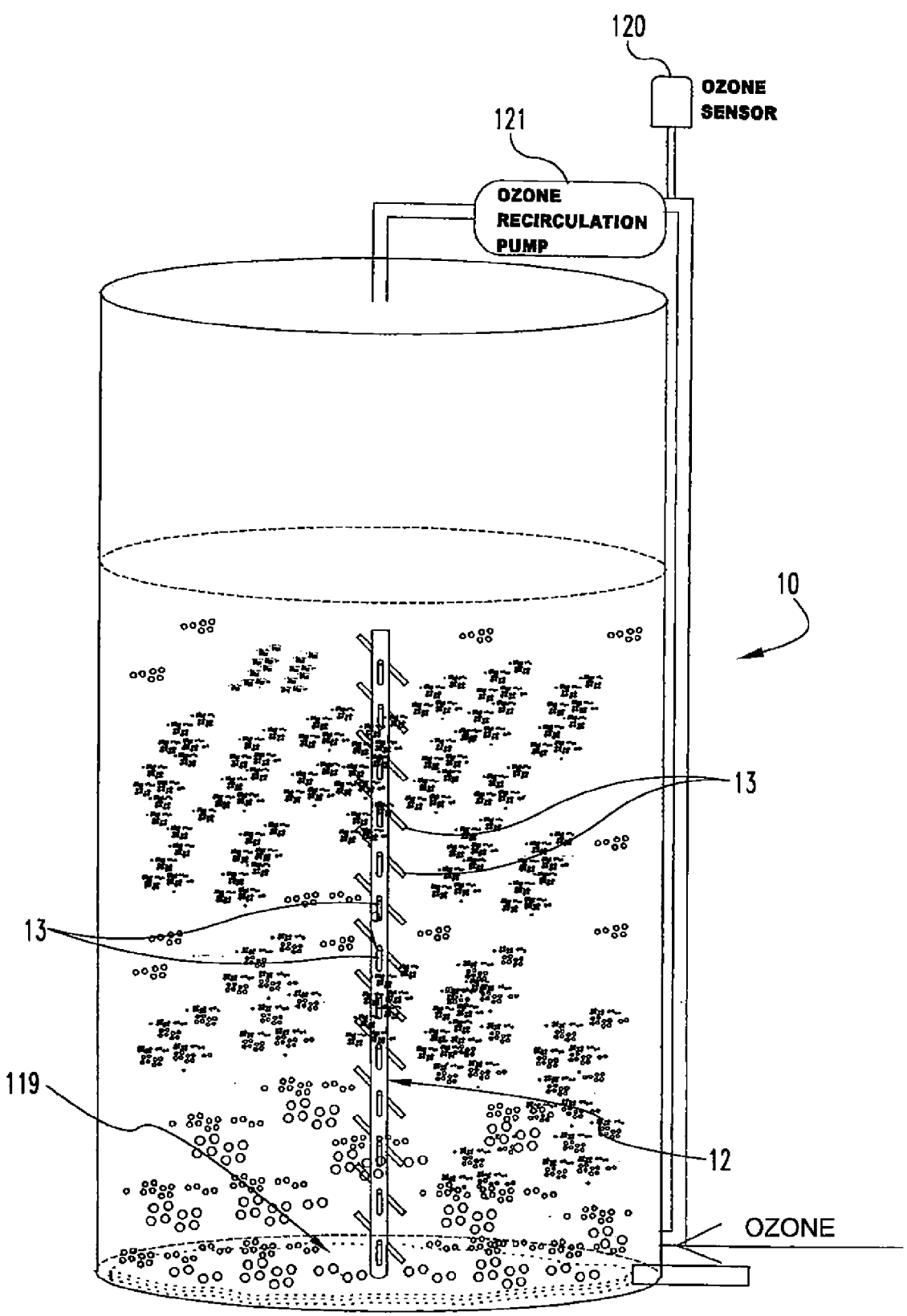
FIG. 2 is a diagrammatic representation of a cell according to the currently preferred embodiment of FIG. 1.

FIG. 2 illustrates the cell 10 in more detail. Converter 12, as illustrated in FIG. 2, extends upwardly into the cell 10. Converter 12 further includes a plurality of branches 13 extending therefrom. The branches 13 more evenly distribute the sonic energy emitted from the converter 12 throughout the cell 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for purifying polluted water, comprising:

filling an enclosure with polluted water from a source;

substantially removing dissolved gasses from the polluted water by subjecting the polluted water in the enclosure to a vacuum; and dissolving ozone into the polluted water in the enclosure after the step of substantially removing dissolved gasses from the polluted water.

2. The method of claim 1 and further comprising before substantially removing dissolved gasses from the polluted water, filtering the polluted water.

3. The method of claim 1 and further comprising straining and filtering the polluted water between the source and the enclosure.

4. The method of claim 1, wherein said vacuum is at a pressure of about 18-21 inches of mercury.

5. The method of claim 1 and further comprising applying ultrasonic energy to the polluted water in the enclosure co-currently with the step of dissolving ozone into the polluted water.

6. The method of claim 5, wherein said ultrasonic energy is applied at a frequency of 25-45 kHz and at a power level of up to about 5000 watts.

7. The method of claim 6, wherein said ultrasonic energy is applied at a frequency of 25 kHz and at a power level of up to about 3000 watts.

* * * * *